United States Patent
Ebner et al.

(10) Patent No.: US 8,437,043 B2
(45) Date of Patent: May 7, 2013

(54) COMPRESSION OF GRAYSCALE IMAGE DATA USING MULTI-BIT HALFTONING

(75) Inventors: Fritz Ebner, Berlin (DE); Peter McCandlish, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 688 days.

(21) Appl. No.: 11/826,893

(22) Filed: Jul. 19, 2007

(65) Prior Publication Data
US 2009/0021791 A1    Jan. 22, 2009

(51) Int. Cl.
G06K 15/00    (2006.01)
H04N 1/601    (2006.01)

(52) U.S. Cl.
USPC ......... 358/3.06; 358/3.01; 358/1.9; 358/3.08; 358/520; 358/518; 358/521; 382/166

(58) Field of Classification Search ........... 358/3.06, 358/520, 518, 521; 382/166
See application file for complete search history.

(56) References Cited

U.S. PATENT DOCUMENTS

| | | | |
|---|---|---|---|
| 4,149,194 A | 4/1979 | Holladay | |
| 5,243,444 A | 9/1993 | Fan | |
| 5,339,365 A | 8/1994 | Kawai et al. | |
| 5,748,770 A * | 5/1998 | Hajjahmad et al. | 382/167 |
| 6,020,897 A * | 2/2000 | Carlsen et al. | 345/629 |
| 6,650,773 B1 * | 11/2003 | Maurer et al. | 382/166 |
| 6,947,178 B2 | 9/2005 | Kuo et al. | |
| 2004/0085591 A1 * | 5/2004 | Huang et al. | 358/3.26 |
| 2004/0091168 A1 * | 5/2004 | Jones et al. | 382/261 |
| 2004/0100644 A1 * | 5/2004 | Anderson | 358/1.9 |
| 2004/0109182 A1 * | 6/2004 | Nagarajan et al. | 358/1.9 |
| 2006/0257045 A1 | 11/2006 | McCandlish et al. | |
| 2008/0239345 A1 * | 10/2008 | Ota | 358/1.9 |
| 2009/0080002 A1 * | 3/2009 | Nakano et al. | 358/1.7 |

* cited by examiner

*Primary Examiner* — Steven Kau
*Assistant Examiner* — Quang N Vo
(74) *Attorney, Agent, or Firm* — Pillsbury Winthrop Shaw Pittman, LLP (57) ABSTRACT

A method and system are provided for reducing the bit depth of grayscale imagery using multi-bit halftoning. The halftoned image data may be lossy or losslessly compressed and stored in memory or transmitted over a communication channel. At the time of printing, the images are decompressed and reconstructed to a grayscale image data using Sigma filtering to preserve edges. Preferably, different Sigma filters may be applied based on contrast information within a local neighborhood region. Fuzzy edge detection may also be used to preserve edge features and prevent smearing.

19 Claims, 5 Drawing Sheets

COMPRESSION OF GRAYSCALE IMAGE DATA USING MULTI-BIT HALFTONING

FIELD

This invention relates to a method and system for compressing grayscale image data using multi-bit halftoning.

BACKGROUND

Many typical image processing applications require large amounts of memory. For example, scanning a printed page, printing an electronic document, or copying a photograph require millions of pixels (picture elements) to be read into a memory, processed, and output to a disk or other output medium. While the cost of memory and disk space has increased many times over the past years, and computer system bandwidth has increased, there is still a drive to reduce the performance (speed) cost and dollar cost of storing and moving around such large amounts of memory in a system. As an example, a 8.5×11 (letter) page size image represented as a 4 color image for rinting (Cyan, Magenta, Yellow, Black), at typical resolutions (e.g., 600 dpi) can consume 4 colors*8.5*11*600 dpi*600 dpi*8 bits/byte=134 megabytes. Thus, there is a high motivation to try to reduce the amount of memory needed to represent the same (or nearly the same) information in a smaller amount of data.

High quality image representations usually encode many values for each pixel that is provided. The pixel bit depth, or number of bits that are represented at each pixel can range from 8 to 12 bits per pixel in many applications, with 8 bits per pixel (bits per pixel is often abbreviated by 'bpp') being the most widely used bit depth. It is generally accepted that a larger number of bits per pixel can represent a higher quality image. This can be true within limits, all other image quality aspects being equal. Reducing the bit depth of an image, while simultaneously enabling the higher bit depth to be re-generated without visible loss to image quality is the subject of this idea.

Copying, scanning and printing operations process an image in stages. There is generally a preprocessing stage, a storage stage, and an outputting stage. Depending on the architecture of the system, the preprocessing stage can include bit-depth reduction, and compression. Bit depth reduction can be accomplished using a technique called halftoning, which is well known in the art, where each pixel is compared to a threshold that is stored in a memory, and, in the simplest case, will assign a 1 if the threshold is greater than the pixel value, and will assign a value of 0 if the threshold is less than the pixel value. This is called binary halftoning. When the output of the halftoning process is a pixel of more than 2 values (1 or 0) but still less than the original number of values, the process is called multi-bit halftoning. Binary halftoning has the advantage of guaranteeing a 8:1 compression ratio over 8 bpp image data, because it replaces every 8 bpp pixel with a 1 bpp pixel. Binary halftoning can, given the proper circumstances, generate very high quality representations of the original input image, but also suffers from problems. Most significantly, if 8 bpp data is desired 'downstream' of the preprocessing stage, e.g. if an output (marking) device requires 8 bpp input, recreating high quality 8 bpp data from the halftoned 1 bpp data is very difficult, especially for a printing process.

More sophisticated machines offer a "store and retrieve" option, whereby stored image data may be later accessed and retrieved for future and different usage as originally intended. Store and retrieve options may be used to retrieve and print image data that was created on a different device at a much different time. Therefore, some image quality correction may have to be performed on the data; some of which is very desirable to do at high bit depth (e.g. 8 bpp is necessary if one wants to apply tone reproduction to the image to calibrate out time or device differences).

Traditionally, binary and contone (8 bpp) raster image processing (RIP) output are used for printing. Low cost printers typically use binary RIP output. Binary Ripping has advantages over other techniques when it is used with sufficient resolution. It can provide a simple 8× reduction in the data volume, and create high quality synthetic object edge rendering at the given resolution. At sufficiently high resolutions it also enables very high frequency halftone screens. In addition, it is simple and the most popular method for printing on office devices; thus exhibits good support from RIP software vendors.

However, there are times when aspects of a marking engine require a grayscale (contone) interface. For example, by providing the marking system (IME) with grayscale data allows the marking system to compensate for spatial non-uniformities in the cross process direction. In addition, providing a grayscale interface allows for built in halftone screens, which may be advantageously tightly coupled with the internals of the IOT.

Copying and printing using grayscale image path is more expensive however, because of the volume of data when compared to binary equivalents. Ripping requires additional system memory, and the reduction in RIP processing speed associated with the handling of additional volumes of data.

Figure 1:
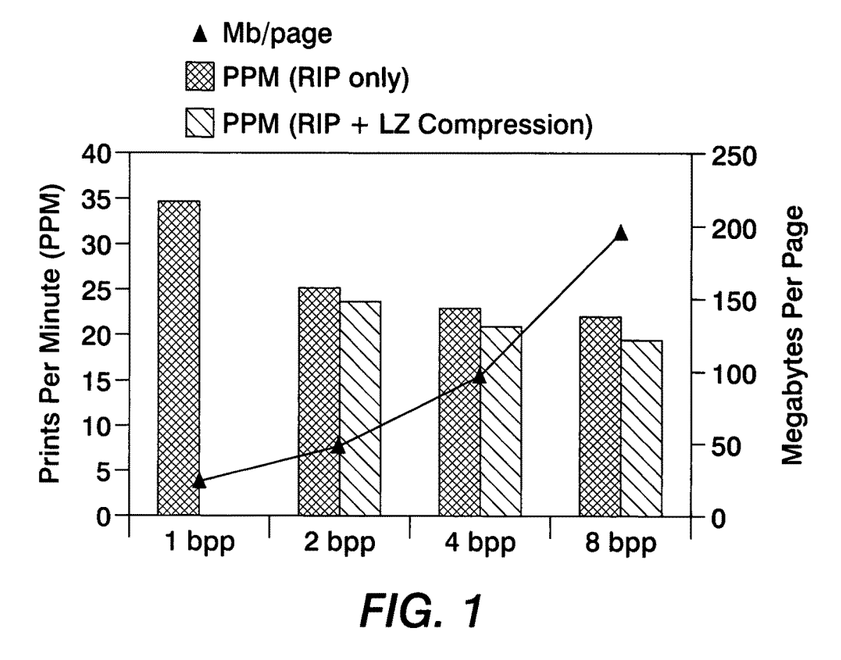
FIG. 1 shows printing rates and memory requirements for 1, 2, 4, and 8 bpp halftoning, respectively.

FIG. 1 illustrates the printing rates and memory requirements for 1, 2, 4, and 8 bpp halftoning, respectively for a printing process. It can be clearly seen that higher bit depth RIPping is slower than lower bit depth RIPping. In general, the increased bandwidth required to write the frames (or bands) slows the process. When subsequently compressing the images using a data compression algorithm, the compression time is generally proportional to the image size (i.e., larger images take longer to compress).

Binary halftoning as part of a copy process (e.g., Binary Data Extended to Contone (BDEC)) is known and uses significantly less memory than copying using 8 bpp. See, for example U.S. Patent Application Publication No. 2006/0257045, herein incorporated by reference. However, it requires the use of rendering tags, creates undesirable artifacts in highlight regions after reconstruction, and is not easily extended to enable the 'store and retrieve' services.

Thus, the inventors have recognized that there is a need to solve the attendant problems of high bandwidth, computational and memory requirements of grayscale processing.

SUMMARY

In a first embodiment of the invention, a method for reducing and reconstructing multi-bit grayscale image data, is provided, comprising: reducing the grayscale image data from a larger multi-bit depth to a smaller multi-bit depth; storing the reduced grayscale image data in a memory, transmitting the reduced grayscale image data over a communication channel, or both; reconstructing the reduced grayscale image data to the larger multi-bit depth; and sending the reconstructed grayscale image data to a printing device accepting grayscale image data.

In a second embodiment of the invention, a system for reducing and reconstructing multi-bit depth grayscale image data, is provided, comprising: a processor for reducing the grayscale image data from a larger multi-bit depth to a smaller multi-bit depth; a processor for compressing the reduced grayscale image data; a memory for storing the compressed image data; a processor for decompressing the compressed image data to the reduced grayscale image data; a processor for reconstructing the reduced grayscale image data from the smaller multi-bit depth to the larger multi-bit depth; and an interface for sending the reconstructed grayscale image data to a printing device accepting grayscale image data.

In a third embodiment of the invention, a computer readable media having stored computer executable instructions, wherein the computer executable instructions, when executed by a computer, directs a computer to perform a method for reducing and reconstructing grayscale image data, is provided, the method comprising: reducing the grayscale image data from a larger multi-bit depth to a smaller multi-bit depth; storing the reduced grayscale image data in a memory, transmitting the reduced grayscale image data over a communication channel, or both; reconstructing the reduced grayscale image data to the larger multi-bit depth; and sending the reconstructed grayscale image data to a printing device accepting grayscale image data.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION

A method and system are disclosed for using multi-bit halftoning in combination with optional data compression to reduce the storage, data transfer, and processing requirements, and in combination with optional data decompression and a reconstruction process to recreate images that are visually lossless reproductions of the original images. The reconstructed images can optionally be sent to a raster output processor and printed on paper.

In the context of the invention, the term "grayscale image" is defined as a digital image with more than 1 bit per pixel (multi-bit depth), and some number of "levels" of intensity. Normally "levels" will correspond to "bits-per-pixel," (e.g., 4 bpp is $2^4$ or 16 levels) but the levels do not necessarily have to. Grayscale image data may also include what is generally referred to as a "contone" image data, which is short for "continuous tone" image data.

In contrast, the term "binary image" is defined as a digital image with only 1 bit per pixel (single-bit depth). As such, pixels of binary images are limited to only two levels: 0 and 1.

In the current embodiment, grayscale images can be combined with any number of other images to represent multiple separation images, for example to represent colors. In a preferred embodiment, each grayscale image represents one of the 4 separations of the CMYK color model (C, M, Y, K).

Using multi-bit halftoning (also referred to as grayscale halftoning) one can reduce data volume without necessarily adversely affecting image quality of the final output image. The halftoner renders intensity or lightness levels by converting the incoming grayscale image to a halftoned image. A halftone representation, however, is only an approximation of an original image. In a preferred embodiment, a grayscale image of 8 bpp (and 256 levels) will be halftoned (using multi-level or grayscale halftoning method) to a grayscale image of 4 bits-per-pixel (and 16 levels).

Halftoning is already a well understood method employed in raster image processing (RIP) systems. See, for example, U.S. Pat. No. 4,149,194, herein incorporated by reference. Halftoning, is usually done in a scalar context, meaning its done one separation (per color) at a time, without regard to the other separations.

Compression is the coding of data to minimize the space needed to store said data. The compression of images is motivated by the economic and logistic needs to conserve space in storage media and to save bandwidth in communication. The compression process may be referred to as "lossless" (also referred to as "reversible" or "noiseless") if the reconstructed image is identical to the original. Conversely, the compression process may be referred to as "lossy" compression (also referred to as "irreversible" or "noisy") if the reconstructed image is not identical to the original (usually of inferior quality, though not necessarily visually detectable).

Figure 2:
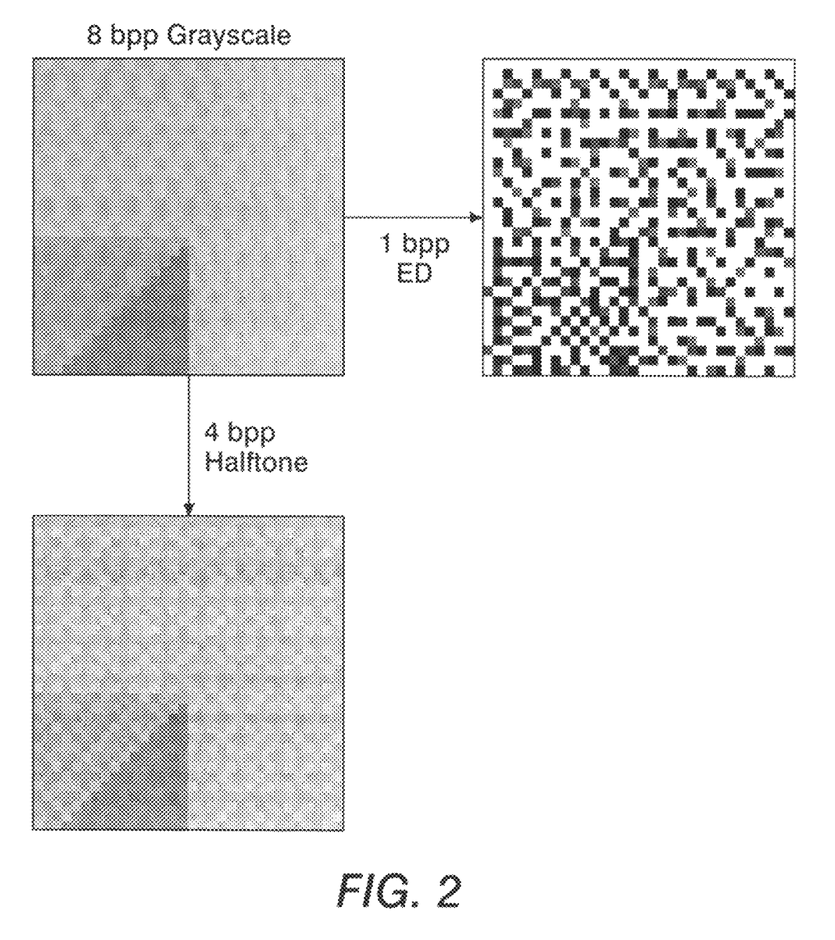
FIG. 2 shows an example of a small region halftoned using 4 bpp multi-bit vs. 1 bpp error defused halftoning.

FIG. 2 shows an example of a small region of a 8 bpp grayscale image halftoned using 4 bpp multi-bit halftoning vs. 1 bpp error defused (ED) halftoning. As clearly shown, the 4 bpp multi-bit halftone retains much more contrast information about the source image than the 1 bpp ED halftone.

Figure 3:
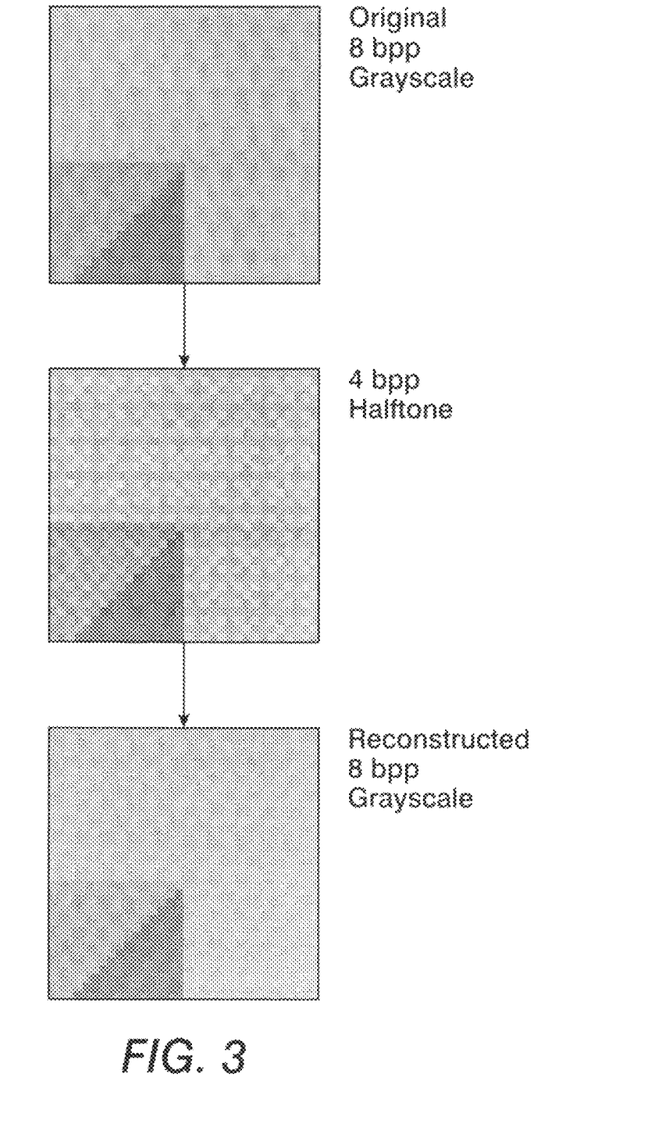
FIG. 3 shows reconstruction of a small region 8 bpp grayscale image after being halftoned to 4 bpp, in accordance with an embodiment of the present invention.

FIG. 3 shows a small region of a grayscale image that is multi-bit halftoned, and later reconstructed, in accordance with an embodiment of the present invention.

In this exemplary embodiment, the original image is either a 8 bpp grayscale image wherein each pixel of the grayscale image is an 8-bit data unit, representing a gray level of 0-255, or the original image is a 4 bpp image that is created during a RIP process, wherein the 4 bpp is created using a multi-bit halftoning process within the RIP process. One skilled in the art will appreciate that the grayscale image may include any numbers of levels or separations of data of any size or dimension.

If the original image is 8 bpp (i.e. not halftoning in a RIP process), the original grayscale image is reduced using a multi-bit halftone screen. In the preferred embodiment, the original grayscale image is multi-bit halftoned to 4 bpp, representing a gray level of 0-15. The 4 bpp halftoned image may further be compressed and stored in a memory.

When the grayscale image data is later needed by the marking or printing engine, the 4 bpp halftoned image may be retrieved from memory, decompressed, and reconstructed to produce a 8 bpp reconstructed grayscale image.

Figure 4:
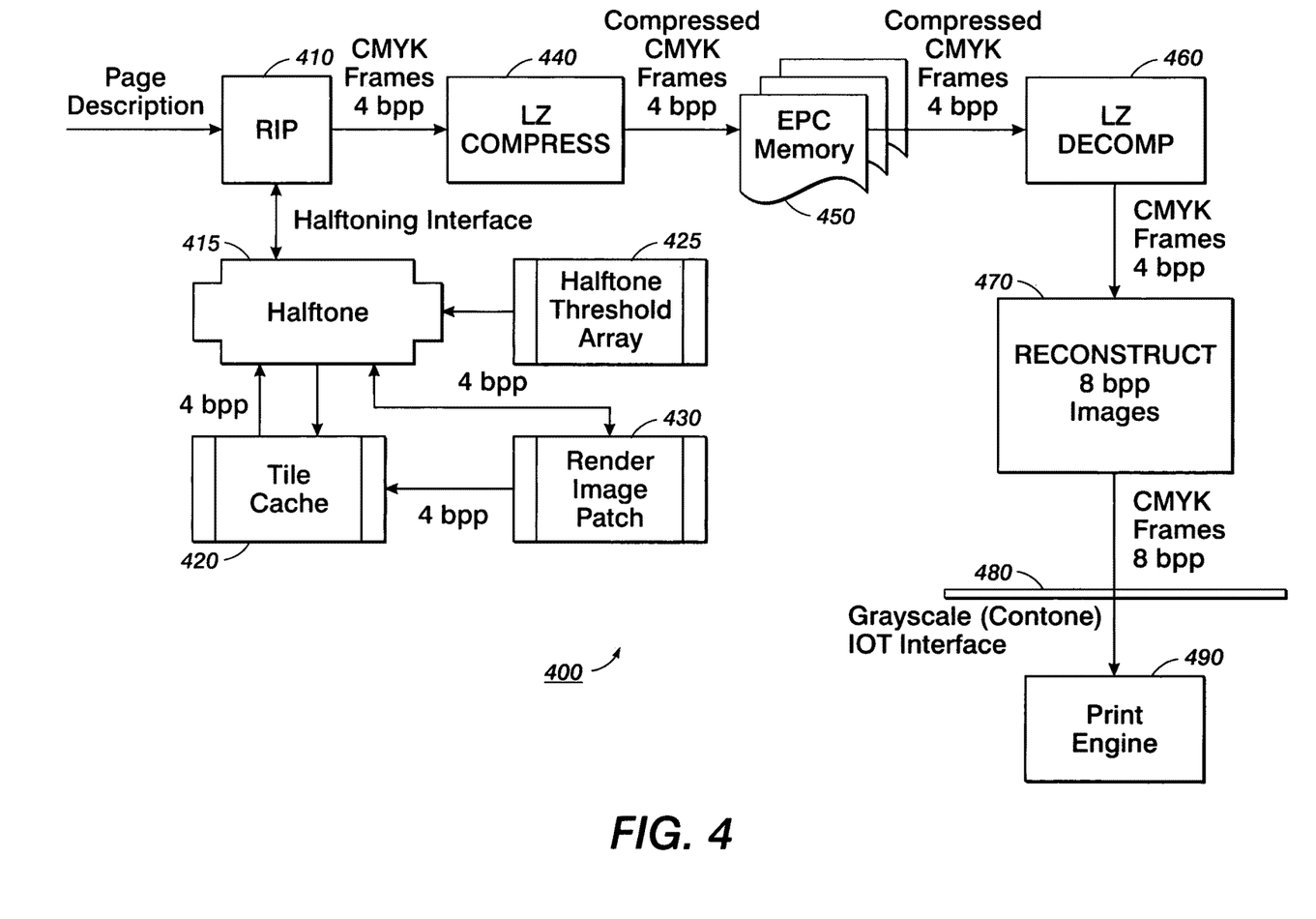
FIG. 4 shows a schematic diagram of a system, in accordance with an embodiment of the present invention.

FIG. 4 details a system 400, in accordance with an embodiment of the invention. First, a raster image processor, RIP 410 takes an input Page Description, as described by a Page Description Language (e.g., PostScript) and creates a multi-bit halftoned image.

Generally, for graphics and text, the color representation in PostScript is 'real,' or floating point, and is represented in 32 or 64 bits. Internally, it is implementation dependent, and is sometimes 12 sometimes 16 bits. For objects that are images (e.g., a .JPG file put into a Microsoft Word® document), they are generally 8 bits, but can also be 12 or 16 bits (though this is not common).

In this case, there is no 'original 8 bpp image,' but an internal representation of data structures that represents the page of 8 bpp or greater grayscale image data, the pixels of which can be halftoned before writing to an output image (at 4 bpp). In a preferred embodiment, a page description of a document is inputted to the RIP 410 (along with parameters to set up the RIP to output 4 bpp color data) and a 4 bpp CMYK halftoned image is outputted. However, it is understood that other multi-bit halftoning may also be used, e.g., 3 bpp or 2 bpp. The 4 bpp halftoned image is advantageously preferred though because only a very small halftone cell (approximately 4×4) is required. This approach requires no rendering tags since there is sufficient information associated with each pixel to encode sufficient edge information, as shown in FIG. 2. Further, reconstruction is very simple and uses a small context (5×5) pixel window.

For a 4 bpp halftoned image, a 4×4 halftone cell can enable nearly perfect reconstruction, while a (tiny) supercell implementation (2 cascaded 4×4 cells) can enable reconstruction of all input levels. The exemplary halftone cell shown below is known as a Bayer halftone and is used in display technologies:

| 1 | 9 | 3 | 11 |
|---|---|---|---|
| 13 | 5 | 15 | 7 |
| 4 | 12 | 2 | 10 |
| 16 | 8 | 14 | 6 |

The Bayer halftone optimally distributes the input grayscale values in space at the maximum spatial frequency, among 16 levels (4×4). For further information regarding Bayer halftones, see, for example "Digital Color Halftoning" by Henry R. Kang. IEEE Press (1999), herein incorporated by reference.

The multi-bit halftoning algorithm is known in the art, and may be used to covert 8 bpp image data to 4 bpp image data as shown below:

$$MS = in / 17;$$
$$LS = in \% 17;$$
$$\text{if } (LS > \text{threshold})$$
$$\quad out = (MS + 1)$$
$$\text{else}$$
$$\quad out = MS;$$

where 'in' is the input 8 bpp grayscale image input and 'out' is the 4 bpp halftoned image output. This algorithm may be implemented either as software or hardware, e.g., in an image processing board. Initially, each 8 bpp grayscale pixel level (0-255) is reduced to a 4 bpp pixel level (0-15) by taking the integer value of the quotient by dividing by 17. The remainder of division from dividing each 8 bpp grayscale pixel level by 17 is calculated using the modulo function. (% or mod).

Referring again to FIG. 4, the RIP 410 interfaces includes a halftoning interface. The halftoning interface includes a halftone module 415; a tile cache 420; a halftone threshold array 425; and render image patch module 430. A particular halftone tile 415 may be retrieved from tile cache 420, which may be a memory, for example, that holds a plurality of halftone tiles. Further, a halftone threshold array 425 may be retrieved from a memory, for example, that holds a plurality of halftone threshold arrays. In the preferred embodiment, the above-mentioned Bayer halftone is used. The halftone interface may be software or hardware, as known in the art, and may be obtained, for example, from an OEM manufacturer or vendor. The RIP process can request a color tile (for example for the color 128), from the tile cache when it needs to paint a constant color into the image frame memory. If the tile exists in the tile cache, it will be returned. If the requested tile does not exist in the tile cache, it must be created by the 'render image patch' 430 module. The 'render image patch' module uses the halftone threshold array to create the tile.

The halftoned image outputted from the RIP 410 may then be compressed by a data compression algorithm or processor 440. A lossless data compression algorithm, for example, using entropy coding such as Lempel-Ziv (LZ) compression or Huffman coding, may be advantageously used to reduce memory requirements. However, it is understood that other data compression algorithms may also be used, preferably, those which provide lossless compression. However, lossy algorithms may also be used.

Compressing the image data is also advantageous for transmitting data over a communication channel, such as a network. The compressed image data reduces bandwidth requirements on the network. The network may include, but is not necessarily limited to, the Internet, Intranets, WANs, LANs, Wireless networks, or combinations thereof. Additionally, the data compression may also be advantageously used for facsimile transfer.

The compressed image may be subsequently stored in memory 450, for example, an electronic pre-collation system (EPC) module with associated memory. Alternatively, the halftone image data may be stored in memory without compression, if memory and/or bandwidth requirements are not a consideration.

When the images are later needed by the printing or marking subsystem, they may be called out of the memory 450 and subsequently decompressed. A decompression algorithm or processor 460 may be used to restore the compress data, using an algorithm for reversing of the one used in the compression algorithm or processor 440. Preferably, the decompressed image data is the identical to the halftoned image data that was outputted from the RIP 410.

Next, the decompressed image is reconstructed to a higher bit depth using a reconstruct logic 470. Advantageously, the reconstructed image is a visually lossless reconstruction of the original 8 bpp grayscale image. Preferably, the reconstruction logic 470 makes use a reconstruction logic which uses Sigma Filters to preserve edges features, for example, as discussed below with respect to FIG. 5.

The reconstructed grayscale image is then passed to a grayscale (contone) image output terminal or IOT 480 of a printer or marking engine 490. The IOT 480 may further perform image processing to make corrections or compensation to correct for deviations in the printing process. Grayscale image data is advantageously provided to the IOT 480, because binary data cannot be easily image processed, without more complicated image processing to convert it back to something like grayscale.

Figure 5:
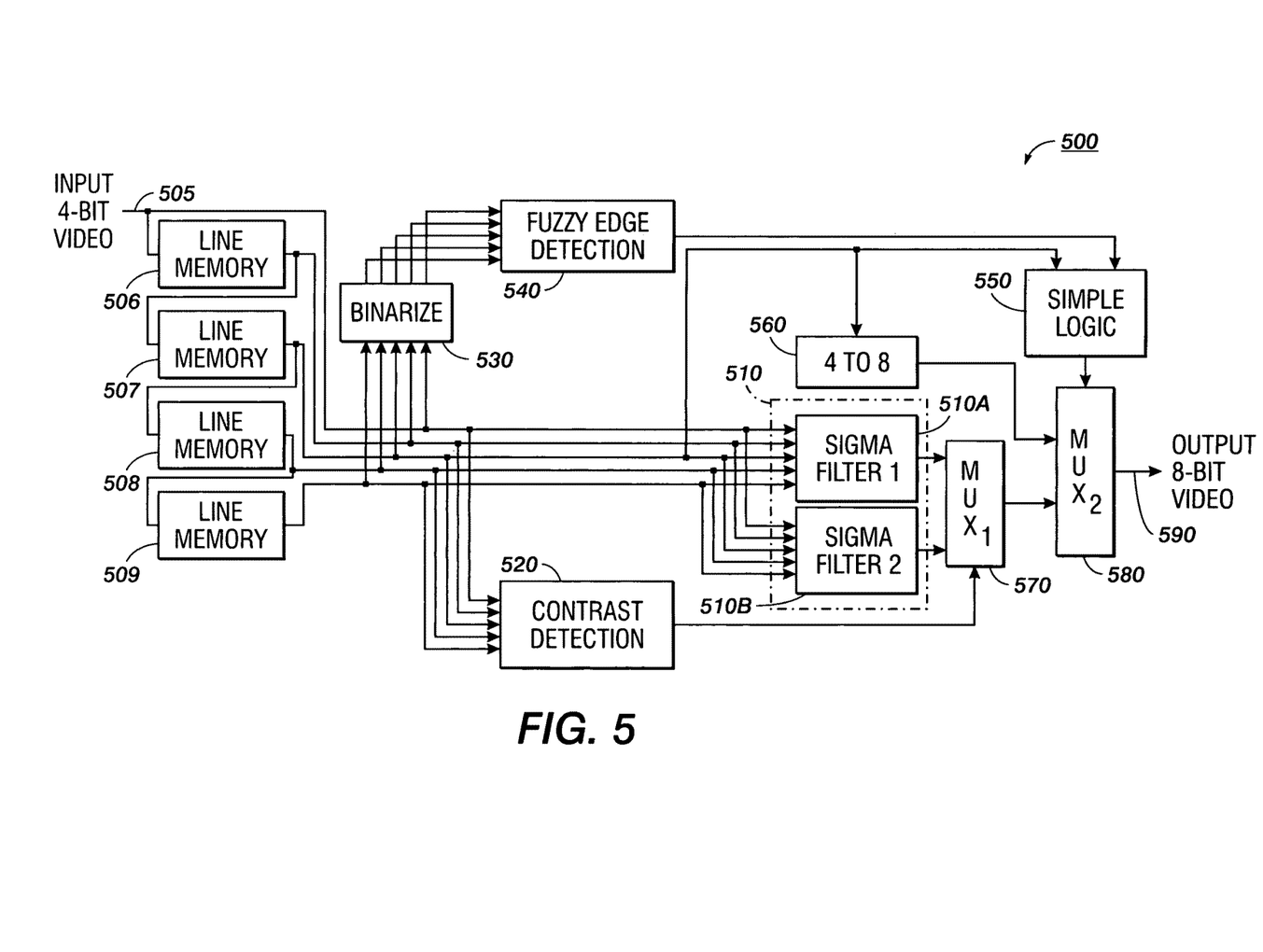
FIG. 5 shows a block diagram of a circuit for reconstructing the grayscale image data from multi-bit halftone image data, in accordance with an embodiment the present invention.

FIG. 5 shows a block diagram of an exemplary reconstruction filter logic 500. It will be appreciated that other reconstruction logic may also be used. Reconstruction of the grayscale image is made on a pixel-by-pixel basis. Preferably though, the reconstruction logic makes use of Sigma Filters to determine where edge features, or other high contrast features, are located within the image and preserve them. Different Sigma Filters banks may be appropriately applied based on contrast information determined within a local neighborhood region of the current pixel.

The INPUT 505 is 4 bpp video signal, which comprises the 4 bpp halftone image data. Reference numerals 506 to 509 denote line memories each for delaying the image data of one line in order to produce a 5×5 pixel window. In this context, the current pixel is the center pixel. While, the preferred embodiment relies on a 5×5 pixel window, pixel windows or other sizes may similarly be provided.

The SIGMA FILTER block 510 prevents smearing of high and low contrast pixel data together when reconstructing image data. Sigma filters are a type of adaptive filter which use an averaging algorithm to suppress to Gaussian noise within the image data. The Sigma Filter averages neighboring pixels within a given pixel window whose intensities are within a threshold value, e.g., two standard deviations of a noise threshold, to determine a mean pixel value. Pixels whose value is outside the threshold are generally ignored. The center pixel value will be replaced with the mean pixel value for the given pixel windows. Sigma Filters are known in the art, for example, as disclosed in U.S. Pat. Nos. 6,947,178 and 5,243,444, herein incorporated by reference.

The SIGMA FILTER block 510 may include multiple filter banks, each configured for a different contrast feature and/or filter size. In the preferred embodiment, two different Sigma Filters 510A, 510B are applied based on the contrast information within a pixel window local neighborhood region, as determined by the CONTRAST DETECTION BLOCK 520, discussed below. The Sigma Filter 510A, 510B are linear filters, except that a given pixel is only included in the filter operation if the difference between the absolute value of a given pixel and the center pixel is less than the given threshold. In a preferred embodiment, using a threshold value of 1 enables all edges with a difference greater than 17 (of 255) to be "detected," and not "smeared" with neighboring values. In a preferred embodiment, the Sigma Filter_1 510A is a "small" 3 pixel by 3 scanline window, and the Sigma Filters_2 510B is a "large" 5 pixel by 5 scanline window.

The CONTRAST DETECTION block 520 determines which sigma filter will be applied based on local contrast. By looking at the local neighborhood of pixels, preferably using the 5×5 pixel window, it computes the maximum (MAX) and minimum (MIN) values of pixel data within the above-mentioned window. If the "contrast," i.e., MAX minus MIN, is greater than a threshold value, then the "small" Sigma Filter_1 510A will be preferably selected, which is more advantageous for preserving high contrast features such as edges; otherwise the "large" Sigma Filter_2 510B will be selected which averages over more pixels.

The BINARIZE block 530 converts the 4 bpp halftoned image data to 1 bpp binary data for input to the FUZZY EDGE DETECTION block 540. Initially, the 4 bpp contains 16 levels (0-15) of data which are converted into binary data (0-1) using a simply algorithm, as follows:

```
if (in=> threshold)
    out = 1
else
    out = 0
```

For example, once an adjustable threshold value is set, the binarize algorithm simply converts all pixel values that are equal to or greater than the threshold value to 1. Otherwise, the pixel values below the threshold value are set to 0.

The FUZZY EDGE DETECTION block 540 identifies edge pixels within the image in order to prevent smearing of low contrast (<=1 count at 4 bpp) features into white areas that would otherwise be subthreshold by the SIGMA FILTERS 510 (and hence included in the filter average). This is particularly important against white pixels, where subthreshold (i.e., a value of less than 15) edges would be smeared onto the white, and become visible. Therefore, it is desired that edges remain hard and that the resultant regions or segments adjacent to the edge be completely isolated from their neighboring pixels. The FUZZY EDGE DETECTION block 540 relies on a fuzzy edge detection algorithm in order to determine whether the current pixel will be affected. Fuzzy edge detection algorithms are known in the digital processing art.

The SIMPLE LOGIC block 550 reacts only if the current pixel is white and FUZZY EDGE DETECTION block 540 determines an edge is present. Its decision will later determine whether to apply the output of the SIGMA FILTER block 510 or not.

The "4 TO 8" block 560 converts the current 4 bpp halftoned image pixel into a 8 bpp image pixel. For example, in one approach the 4 bpp pixel value having 16 levels (0-15) is converted to an 8 bpp pixel value having 32 levels (0-255) by simply multiplying each 4 bpp pixel level by 17. Since only a single pixel level is used, the algorithm does not take into account the effect of neighboring pixels. This is important for edge features or other high contrast pixels.

A first multiplexer ($MUX_1$) block 570 is used to select a particular Sigma Filter 510A, 510B of the SIGMA FILTER block 510 based on the output of the CONTRAST DETECTION block 520. For example, if the CONTRAST DETECTION block 520 determines that a "small" window is required, the output of Sigma Filter_1 510A is selected. Otherwise, the "large" window, the output of Sigma Filter_2 510B is selected.

A second multiplexer ($MUX_2$) 580 is used to select between the output of the $MUX_1$ 570 and the "4 TO 8" block 560 based on the output of the SIMPLE LOGIC block 550. This block advantageously protects against pixel smearing. For example, if there is an edge nearby and the current pixel is determined to be white (as detected by the SIMPLE LOGIC block 520), then the $MUX_2$ 580 will select the output of the "4 TO 8" block 560 rather than using output of the from $MUX_1$ 570 from the SIGMA FILTER block 510. This will advantageous preserve the edge and prevent smearing.

Finally, the reconstructed 8 bpp grayscale image data is provided from OUTPUT 590. The output signal is 8 bpp grayscale video.

The inventors have determined that 4 bpp halftoning provides a 2:1 guaranteed compression ratio and is simply reconstructed to 8 bpp without visual artifacts. Results indicate that a good performance improvement (30% better than losslessly compressed 8-bit grayscale) is demonstrated with little compromise in image quality. Although the present invention is preferably implemented using a 4 bpp multi-bit halftone, for RIP output compression, it is also applicable to differing bit depths (e.g., 3 bpp or 2 bpp), different color spaces (e.g., CMYL, RGB or YCC), and different modalities (i.e., copying, scanning, or faxing).

It is appreciated that the above embodiments may be implemented either using hardware, or software, or a combination thereof.

While the specific embodiments of the present invention have been described above, it will be appreciated that the invention may be practiced otherwise than described. The description is not intended to limit the invention.

What is claimed is:

1. A method for reducing and reconstructing multi-bit grayscale image data, comprising: reducing the grayscale image data from a first multi-bit depth to a second multi-bit depth, wherein the reduction is a multi-bit halftoning process that uses a halftone screen, and the first multi-bit depth is greater than the second multi-bit depth;
storing the reduced grayscale image data in a memory, transmitting the reduced grayscale image data over a communication channel, or both;
reconstructing the reduced grayscale image data to the first multi-bit depth without visible loss to image quality while preserving edge features in the grayscale image; and
sending the reconstructed grayscale image data to a printing device accepting grayscale image data.

2. The method according to claim 1, further comprising:
compressing the reduced grayscale image data using a data compression or image compression algorithm;
storing the compressed image data in the memory;
retrieving the compressed image data from the memory; and
decompressing the reduced grayscale image data using a data compression or image compression algorithm.

3. The method according to claim 1, further comprising:
compressing the reduced grayscale image data using a data compression or image compression algorithm;
transmitting the reduced grayscale image data over the communication channel; and
decompressing the reduced grayscale image data using a data compression or image compression algorithm.

4. The method according to claim 2, wherein the compression is lossy or lossless.

5. The method according to claim 2, wherein the compression comprises entropy coding the reduced image data.

6. The method according to claim 5, wherein the entropy coding is LZ compression or Huffman coding.

7. The method according to claim 1, wherein the communication channel is a network.

8. The method according to claim 1, wherein the multi-bit halftone is a Bayer halftone.

9. The method according to claim 1, wherein the memory is EPC memory.

10. The method according to claim 1, wherein the first multi-bit depth grayscale image data is 8 bpp.

11. The method according to claim 1, wherein the second multi-bit depth grayscale image data is 4 bpp, 3 bpp or 2 bpp.

12. The method according to claim 1, wherein the reconstruction comprises filtering.

13. The method according to claim 12, wherein the filtering is performed at least one adaptive filter.

14. The method according to claim 13, wherein the at least one filter is a Sigma Filter.

15. The method according to claim 13, wherein the at least one adaptive filter comprises two filters, one filter for low contrast image data, and the other for high contrast data.

16. A system for reducing and reconstructing multi-bit depth grayscale image data, comprising:
a processor for reducing the grayscale image data from a first multi-bit depth to a second multi-bit depth, wherein the reduction is a multi-bit halftoning process that uses a halftone screen, and the first multi-bit depth is greater than the second multi-bit depth;
a processor for compressing the reduced grayscale image data;
a memory for storing the compressed image data;
a processor for decompressing the compressed image data to the reduced grayscale image data; a processor for reconstructing the reduced grayscale image data from the second multi-bit depth to the first multi-bit depth without visible loss to image quality while preserving edge features in the grayscale image; and
an interface for sending the reconstructed grayscale image data to a printing device accepting grayscale image data.

17. The system according to claim 16, further comprising a network communications channel for transferring the compressed image data.

18. The system according to claim 16, wherein any one of the processors includes multiple processors.

19. A non-transitory computer readable media having stored computer executable instructions, wherein the computer executable instructions, when executed by a computer, directs a computer to perform a method for reducing and reconstructing grayscale image data, the method comprising:
reducing the grayscale image data from a first multi-bit depth to a second multi-bit depth, wherein the reduction is a multi-bit halftoning process that uses a halftone screen, and the first multi-bit depth is greater than the second multi-bit depth;
storing the reduced grayscale image data in a memory, transmitting the reduced grayscale image data over a communication channel, or both;
reconstructing the reduced grayscale image data to the first multi-bit depth without visible loss to image quality while preserving edge features in the grayscale image; and
sending the reconstructed grayscale image data to a printing device accepting grayscale image data.

* * * * *